US012800943B2

(12) United States Patent
Lee

(10) Patent No.: US 12,800,943 B2
(45) Date of Patent: Nov. 17, 2026

(54) SYSTEMS AND METHODS FOR GENERATING A FLAT-TOP ILLUMINATION BEAM BASED ON INTERLACING, INCOHERENTLY OVERLAPPING SPOTS

(71) Applicant: KLA Corporation, Milpitas, CA (US)

(72) Inventor: Chun Shen Lee, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 379 days.

(21) Appl. No.: 18/369,609

(22) Filed: Sep. 18, 2023

(65) Prior Publication Data

US 2024/0118556 A1 Apr. 11, 2024

Related U.S. Application Data

(60) Provisional application No. 63/413,631, filed on Oct. 6, 2022.

(51) Int. Cl.

| | |
|---|---|
| ***G02B 27/01*** | (2006.01) |
| ***G02B 27/10*** | (2006.01) |
| ***G02B 27/12*** | (2006.01) |
| ***G02B 27/42*** | (2006.01) |

(52) U.S. Cl.

CPC ..... *G02B 27/4244* (2013.01); *G02B 27/1086* (2013.01); *G02B 27/123* (2013.01)

(58) Field of Classification Search

CPC ............ G02B 27/4244; G02B 27/1086; G02B 27/123; G03F 7/0075

USPC .......................................... 356/237.1; 355/71

See application file for complete search history.

(56) References Cited

U.S. PATENT DOCUMENTS

| | | | |
|---|---|---|---|
| 6,466,315 | B1 | 10/2002 | Karpol et al. |
| 9,151,940 | B2 | 10/2015 | Chuang et al. |
| 9,494,531 | B2 | 11/2016 | Chuang et al. |
| 9,645,502 | B2 | 5/2017 | Jager et al. |
| 9,793,673 | B2 | 10/2017 | Chuang et al. |
| 10,044,164 | B2 | 8/2018 | Chuang et al. |
| 10,748,737 | B2 | 8/2020 | Ioakeimidi et al. |

(Continued)

FOREIGN PATENT DOCUMENTS

| | | |
|---|---|---|
| CN | 202948203 U | 5/2013 |
| CN | 103399406 B | 7/2015 |

(Continued)

OTHER PUBLICATIONS

Kamel Aït-Ameur et al., "Generation of shape-invariant flat-top laser beams," Proc. SPIE 9343, Laser Resonators, Microresonators, and Beam Control XVII, Mar. 3, 2015, 9 pages.

(Continued)

*Primary Examiner* — Audrey Y Chang

(74) *Attorney, Agent, or Firm* — Suiter Swantz IP

(57) ABSTRACT

A flat-top beam generating system may include a beamsplitting apparatus including one or more beamsplitters to split an input beam into three or more sub-beams that propagate along optical paths with different optical path lengths. The system may further include a diffractive optical element (DOE) to diffract the three or more sub-beams into a plurality of diffracted sub-beams. The system may further include one or more optical elements configured to collect the plurality of diffracted sub-beams to provide a flat-top beam.

20 Claims, 10 Drawing Sheets

100

(56) References Cited

U.S. PATENT DOCUMENTS

| | | | | |
|---|---|---|---|---|
| 2003/0227618 | A1* | 12/2003 | Some | G01N 21/9501 356/237.1 |
| 2006/0054606 | A1* | 3/2006 | Amako | B23K 26/0665 219/121.76 |
| 2007/0127005 | A1* | 6/2007 | Visser | G03F 7/70075 355/71 |
| 2007/0295974 | A1 | 12/2007 | Fontanella et al. | |
| 2011/0164221 | A1* | 7/2011 | Tilleman | H04N 9/3167 359/489.08 |
| 2016/0359292 | A1 | 12/2016 | Chuang et al. | |
| 2022/0184734 | A1 | 6/2022 | Ohmori et al. | |

FOREIGN PATENT DOCUMENTS

| | | | |
|---|---|---|---|
| JP | 2003053577 | A | 2/2003 |
| KR | 1020210102743 | A | 8/2021 |
| KR | 1020210141799 | A | 11/2021 |
| WO | 2021162352 | A1 | 8/2021 |

OTHER PUBLICATIONS

Kun Gao et al., "Flat-top laser beam generated by coherent beam combining of Gaussian lasers," Chinese Optics Letters, vol. 8, No. 1, Mar. 4, 2009, 3 pages.

Korean Intellectual Property Office, International Search Report and Written Opinion received in International Application No. PCT/US2023/034496, Feb. 2, 2024, 8 pages.

* cited by examiner

100

SYSTEMS AND METHODS FOR GENERATING A FLAT-TOP ILLUMINATION BEAM BASED ON INTERLACING, INCOHERENTLY OVERLAPPING SPOTS

CROSS-REFERENCE TO RELATED APPLICATION

The present application claims the benefit under 35 U.S.C. § 119(e) of U.S. Provisional Application Ser. No. 63/413,631, filed Oct. 6, 2022, and naming Chun Shen Lee as inventor, which is incorporated herein by reference in the entirety.

TECHNICAL FIELD

The present disclosure relates generally to the generation of a beam with a flat-top illumination profile and, more particularly, to the generation of a beam with a flat-top illumination profile through incoherent combination of laser spots.

BACKGROUND

Laser sources typically generate light with a non-uniform spatial profile such as, but not limited to, a Gaussian profile. However, a uniform spatial profile, which is commonly referred to as a flat-top profile, is beneficial for many applications including, but not limited to, optical inspection.

Generating a flat-top illumination profile using coherent light such as laser light presents certain challenges. For example, techniques based on beam shaping may depend critically on the beam quality and/or shape of an initial beam and may thus be intolerant to variations of such parameters. As another example, interference between different portions of a shaped beam may exhibit speckle, which may produce an unstable distribution of nonuniformities.

There is therefore a need to develop systems and methods for addressing the above deficiencies.

SUMMARY

A system is disclosed in accordance with one or more illustrative embodiments of the present disclosure. In embodiments, the system includes a beamsplitting apparatus including one or more beamsplitters to split an input beam into three or more sub-beams that propagate along optical paths with different optical path lengths. In embodiments, the system includes a diffractive optical element (DOE) configured to diffract the three or more sub-beams into diffracted sub-beams. In embodiments, the system includes one or more optical elements to collect the diffracted sub-beams and provide a flat-top beam.

A system is disclosed in accordance with one or more illustrative embodiments of the present disclosure. In embodiments, the system includes a laser source to generate an input beam. In embodiments, the system includes a beamsplitting apparatus including one or more beamsplitters to split the input beam into three or more sub-beams that propagate along optical paths with different optical path lengths. In embodiments, the system includes a DOE configured to diffract the three or more sub-beams into diffracted sub-beams. In embodiments, the system includes one or more optical elements to collect the diffracted sub-beams and provide a flat-top beam.

A method is disclosed in accordance with one or more illustrative embodiments of the present disclosure. In embodiments, the system includes splitting an input beam into three or more sub-beams that propagate along optical paths with different optical path lengths with a beamsplitting apparatus including one or more beamsplitters. In embodiments, the system includes diffracting the three or more sub-beams into a plurality of diffracted sub-beams with a DOE. In embodiments, the system includes collecting the plurality of diffracted sub-beams with one or more optical elements to provide a flat-top beam.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing a flat-top illumination profile of light from a coherent input beam. In embodiments, a coherent input beam is split into multiple sub-beams that are temporally delayed with respect to each other. The temporally-delayed sub-beams are then each diffracted by a diffractive optical element (DOE) to generate many diffracted sub-beams, which are then collected by a lens to generate an output beam. In this configuration, the diffracted sub-beams may be partially overlapping such that the output beam as a whole may have a flat-top illumination profile. Further, since the diffracted sub-beams are temporally delayed with respect to each other, speckle may be prohibited or at least mitigated to be below a selected tolerance. Put another way, the diffracted sub-beams may provide interlacing, incoherently overlapping spots (110S), where an intensity distribution of the resulting output beam may be associated with a simple summing of the intensities of the diffracted sub-beams rather than a summation of the field amplitudes that would otherwise lead to interference and speckle generation.

Referring now to FIGS. 1A-5, systems and methods providing flat-top illumination from a coherent input beam are described in greater detail, in accordance with one or more embodiments of the present disclosure.

Figure 1A:
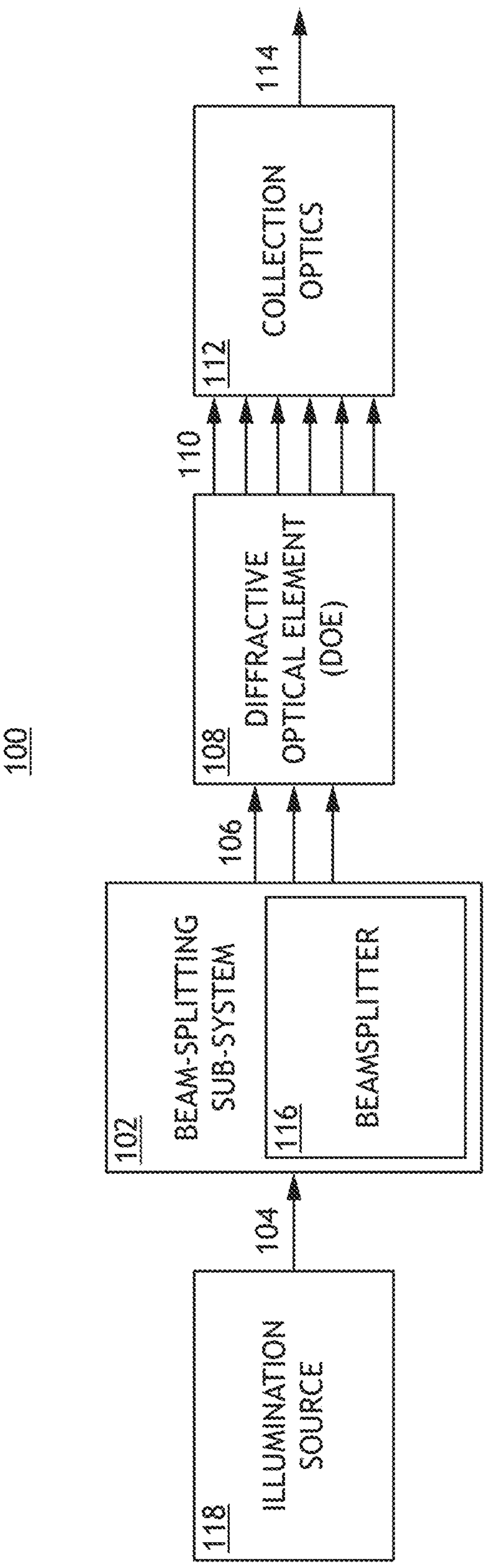
FIG. 1A is a block diagram of a beam shaping system, in accordance with one or more embodiments of the present disclosure.

FIG. 1A is a block diagram of a beam shaping system 100, in accordance with one or more embodiments of the present disclosure.

In embodiments, the beam shaping system 100 includes a beam-splitting sub-system 102 that splits a coherent input beam 104 into three or more sub-beams 106 that propagate along different optical paths with different optical path lengths to a diffractive optical element (DOE) 108. The DOE 108 may then diffract the sub-beams 106 into multiple diffracted sub-beams 110 and one or more collection optics 112 configured to collect the diffracted sub-beams 110 to form a flat-top beam 114 with a flat-top illumination profile. In this configuration, different optical path lengths of the sub-beams 106 prior to the DOE 108 ensure that the various diffracted sub-beams 110 that form the flat-top beam 114 are mutually incoherent with respect to each other (e.g., uncorrelated) and thus do not interfere to form a speckle pattern. As a result, the various diffracted sub-beams 110 may be arranged in a partially-overlapping configuration such that the overall intensity distribution of the flat-top beam 114 may be uniform within a selected tolerance.

Figure 2:
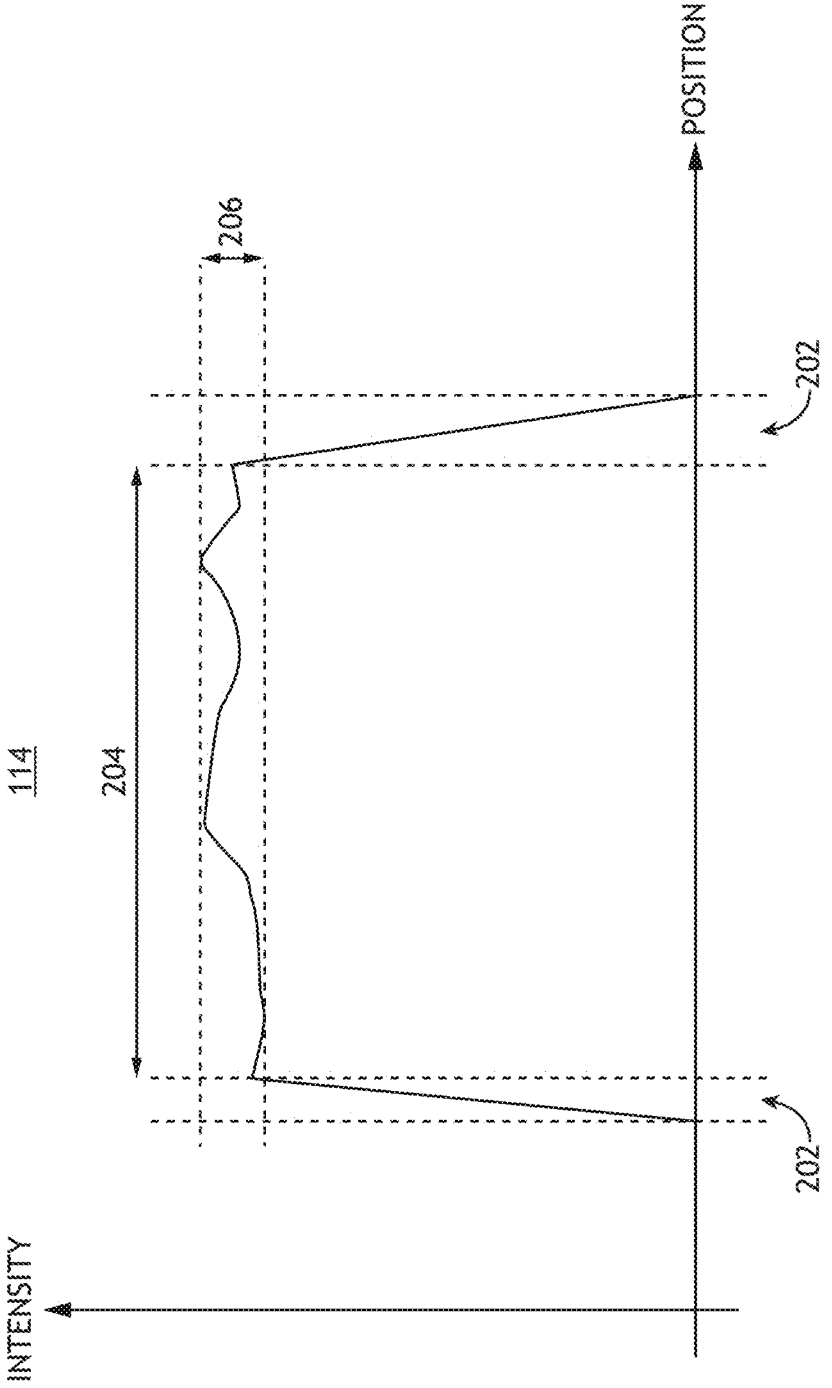
FIG. 2 is a simplified spatial intensity plot of the flat-top beam in a plane of interest, in accordance with one or more embodiments of the present disclosure.

FIG. 2 is a simplified spatial intensity plot of the flat-top beam 114 in a plane of interest, in accordance with one or more embodiments of the present disclosure.

In embodiments, the intensity profile of the flat-top beam 114 may be characterized by transition regions 202 and a central region 204, where the intensity is substantially uniform in the central region 204 and transitions sharply down to zero or a nominally low intensity within the transition regions 202.

As used herein, the terms flat-top illumination profile or flat-top distribution are used to indicate a uniform spatial intensity profile within a central region 204 as measured in a cross-sectional plane orthogonal to a propagation direction. Further, the spatial intensity profile may be uniform according to any selected metric.

For example, the intensity profile of the flat-top beam 114 in a plane of interest may have a peak-to-valley difference 206 below a selected tolerance. As another example, a statistical metric describing a variation of the intensity profile of the flat-top beam 114 in a plane of interest such as, but not limited to, an average value, a variance, a standard deviation, or a root-mean-squared (RMS) value may have a value below a selected tolerance.

Referring again to FIG. 1A, the beam-splitting sub-system 102 may include any combination of optical elements configured to split the input beam 104 into the sub-beams 106 and further to provide that the various sub-beams 106 propagate along different optical paths to the DOE 108 with different optical path lengths such that the resulting diffracted sub-beams 110 may incoherently combine to form the flat-top beam 114. For example, the beam-splitting sub-system 102 may include one or more beamsplitters 116 with any splitting ratios to generate the sub-beams 106. As another example, the beam-splitting sub-system 102 may include various optical elements suitable for providing different optical path lengths for the sub-beams 106 such as, but not limited to, one or more mirrors, one or more optical fibers, or one or more transparent optical elements with selected thicknesses. As another example, the beam-splitting sub-system 102 may include various beam manipulation optics such as, but not limited to, lenses, mirrors, polarizers, or waveplates.

The diffracted sub-beams 110 may be arranged in any one-dimensional (1D) or two-dimensional (2D) distribution such that the flat-top beam 114 may have any corresponding 1D or 2D flat-top distribution. In embodiments, the sub-beams 106 are directed to the DOE 108 with different incidence angles (e.g., different azimuth and/or polar incidence angles). In this configuration, the DOE 108 may diffract each sub-beam 106 into an array of diffracted sub-beams 110 (e.g., a 1D or 2D array), where the various arrays of diffracted sub-beams 110 are interlaced to form the flat-top beam 114.

The input beam 104 may be generated by any suitable illumination source 118 configured to generate coherent light (e.g., spatially and/or temporally coherent light). In embodiments, the illumination source 118 includes a laser source such that the input beam 104 is a laser beam. The input beam 104 may further have any spectral or temporal profile. In embodiments, the input beam 104 is a continuous-wave (CW) beam with a relatively narrow bandwidth. In embodiments, the input beam 104 is a pulsed beam having any pulse duration or spectral bandwidth.

The DOE 108 may include any optical element or combination of optical elements suitable for splitting incident sub-beams 106 into multiple diffracted sub-beams 110. For example, the DOE 108 may include an optical element including a 1D or 2D distribution of features (e.g., diffractive features) suitable for diffracting incident sub-beams 106 into a desired distribution (e.g., a desired angular distribution) of diffraction orders that form the diffracted sub-beams 110. The diffractive features may generally be characterized by any number of characteristic pitches (or spatial frequencies) along any number of directions. As an illustration, the diffractive features may include a sinusoidal diffraction grating characterized by a single pitch (e.g., a single spatial frequency) along a particular direction. More generally, however, the diffractive features may include any complex distribution of features with any complex distribution of spatial frequencies suitable for generating any desired spatial distribution in a near or far field. In embodiments, the diffractive features of the DOE 108 are arranged to provide two or more diffracted sub-beams 110 with controlled beam shapes and angular distributions. For example, the diffractive features of the DOE 108 may be arranged to provide two or more diffracted sub-beams 110 having equal intensities. As another example, the diffractive features of the DOE 108 may be arranged to provide two or more diffracted sub-beams 110 having a selected unequal distribution of intensities. Further, each diffracted sub-beam 110 may have any selected beam profile such as, but not limited to, a Gaussian beam profile or a flat-top beam profile.

The diffractive features of the DOE 108 may be fabricated using any suitable technique. For instance, the diffractive features may correspond to refractive index modulations within a volume of a transparent material, surface relief features, or reflective features (e.g., patterned metallic features). Further, the DOE 108 may be formed as a transmissive optic such that the diffracted sub-beams 110 may exit on an opposing face relative to an incident sub-beam 106 or as a reflective optic such that the diffracted sub-beams 110 may exit on a common face as an incident sub-beam 106.

Referring now to FIGS. 1B-1F, the operation of the beam shaping system 100 is described in greater detail, in accordance with one or more embodiments of the present disclosure.

Figure 1B:
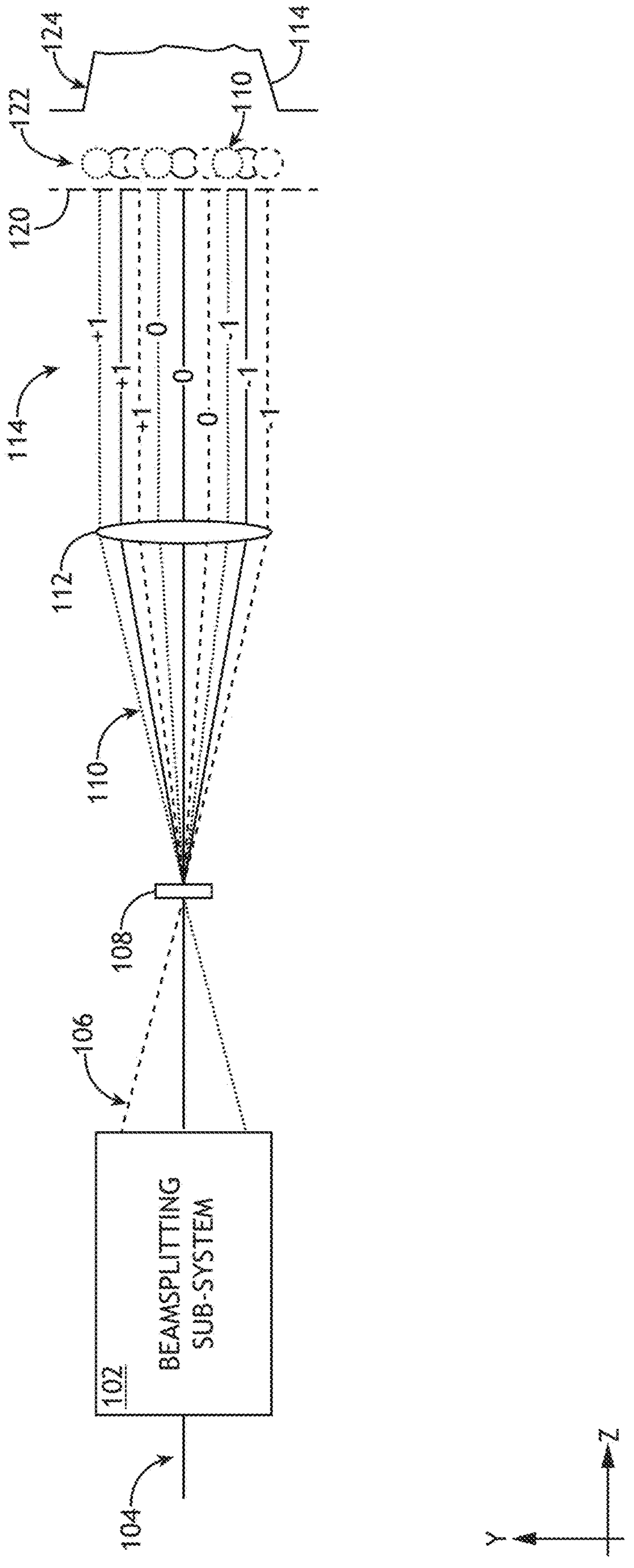
FIG. 1B is a simplified schematic of the beam shaping system, in accordance with one or more embodiments of the present disclosure.

FIG. 1B is a simplified schematic of the beam shaping system 100, in accordance with one or more embodiments of the present disclosure.

In embodiments, the beam-splitting sub-system 102 splits an input beam 104 into three or more sub-beams 106 and directs the sub-beams 106 to the DOE 108 along different optical paths with different optical path lengths such that the sub-beams 106 are temporally uncorrelated with respect to each other. Designs of the beam-splitting sub-system 102 are described in greater detail with respect to FIGS. 1C-1F.

In embodiments, as depicted in FIG. 1B, the beam-splitting sub-system 102 may direct the various sub-beams 106 to a common location on the DOE 108 but at different incidence angles. It is contemplated herein that directing the sub-beams 106 to a common location on the DOE 108 at different angles may beneficially provide an interlaced array of diffracted sub-beams 110 emerging from the DOE 108. In particular, since each of the sub-beams 106 are incident on a common portion of the DOE 108 that includes a common set of diffractive features, the DOE 108 may diffract each incident sub-beam 106 into identical 1D or 2D arrays of diffracted sub-beams 110, where the arrays are angularly shifted with respect to each other based on the relative incidence angles of the sub-beams 106.

As an illustration, FIG. 1B depicts a configuration in which the sub-beams 106 all propagate within the Y-Z plane of the figure and are incident on the DOE 108 at different incident angles, whereupon the DOE 108 generates an array of three diffracted sub-beams 110 for each incident diffracted sub-beam 110 (e.g., associated with +1 order diffraction, 0 order diffraction, and −1 order diffraction). Further, the arrays of diffracted sub-beams 110 are interlaced.

In embodiments, the one or more collection optics 112 may collect the diffracted sub-beams 110 from the DOE 108 to form the flat-top beam 114. The collection optics 112 may include any type or combination of optical elements configured to receive the diffracted sub-beams 110 and direct them along parallel optical paths to form the flat-top beam 114 such as, but not limited to, one or more lenses or one or more mirrors. For example, the diffracted sub-beams 110 may be angularly diverging from the DOE 108 such that collection optics 112 are needed to collect and parallelize the diffracted sub-beams 110. The one or more collection optics 112 may further direct the diffracted sub-beams 110 as the flat-top beam 114 to a target plane 120 at which a flat-top illumination distribution is desired. The target plane 120 may be at any location. As an illustration, FIG. 1B depicts a configuration in which a collection optic 112 (e.g., a lens) collimates the diffracted sub-beams 110 such that they propagate in parallel and form a collimated flat-top beam 114. In this way, the target plane 120 may correspond to any plane after the lens up to an infinite distance such that the flat-top beam 114 may have a flat-top distribution at any location after the collection optic 112. Inset 122 depicts a simplified illustration of overlapping diffracted sub-beams 110 at the target plane 120, whereas inset 124 depicts a simplified illustration of a total intensity distribution of the flat-top beam 114 at the target plane 120 based on the overlapping diffracted sub-beams 110.

It is understood, however, that the diffracted sub-beams 110 may have some non-zero divergence. As a result, the term collimation is used herein to described light that is collimated within a tolerance suitable for a particular application. As another illustration, though not shown, one or more collection optics 112 may focus the diffracted sub-beams 110 to the target plane 120 such that the flat-top beam 114 may have a flat-top illumination profile at least at the target plane 120.

In embodiments, the various components of the beam shaping system 100 are configured together to provide that the flat-top beam 114 has a flat-top distribution at least at the target plane 120. In particular, since the diffracted sub-beams 110 are temporally uncorrelated, the intensity distribution of the flat-top beam 114 in the target plane 120 may correspond to a sum of the intensity distributions of the diffracted sub-beams 110. In contrast, temporal correlations between the diffracted sub-beams 110 may give rise to interference effects such as, but not limited to, speckle that may negatively impact the intensity uniformity across the central region 204 of the flat-top beam 114.

For example, the various components of the beam shaping system 100 may be configured to provide that the diffracted sub-beams 110 partially overlap in the target plane 120 such that the sum of the intensities is uniform within a selected metric as described previously herein.

It is contemplated herein that a distribution of the diffracted sub-beams 110 required to provide a flat-top distribution may depend on the precise intensity distributions (e.g., beam profiles) of the diffracted sub-beams 110 and related parameters such as peak intensity or beam size. As an illustration in a configuration where the diffracted sub-beams 110 each have a Gaussian profile, the tails of the Gaussian profiles may be overlapped to provide a flat-top distribution.

It is further contemplated herein that the distribution or pattern of the diffracted sub-beams 110 (e.g., the spacing between the diffracted sub-beams 110) may be controlled via parameters associated with the beam-splitting sub-system 102, the DOE 108, the collection optics 112, and/or the input beam 104. For example, a pattern of diffracted sub-beams 110 generated by the DOE 108 based on each incident sub-beam 106 may be based on the characteristic pitches (or spatial frequencies) in the DOE 108, a wavelength of the input beam 104, or an incidence angle of the sub-beam 106 on the DOE 108. As another example, a spatial separation (e.g., an interlacing) of arrays of diffracted sub-beams 110 from the various sub-beams 106 may further depend on a distribution of incidence angles of the sub-beams 106 on the DOE 108. As another example, the separation between the various diffracted sub-beams 110 (e.g., the density of the diffracted sub-beams 110) may be controlled in part by a separation distance 126 between the DOE 108 and a collection optic 112 since the diffracted sub-beams 110 may be diverging from the DOE 108. In this way, the distribution of the diffracted sub-beams 110 within the flat-top beam 114 may be tailored to provide a flat-top distribution based on the combined selection and/or configuration of the beam-splitting sub-system 102, the DOE 108, the collection optics 112, and/or the input beam 104.

Further, it is to be understood that FIG. 1B and the associated description is provided solely for illustrative purposes and should not be interpreted as limiting the present disclosure. For example, FIG. 1B depicts a 1D flat-top beam 114 based on a 1D distribution of diffracted sub-beams 110 in the Y-Z plane of the figure. However, the beam shaping system 100 may provide a flat-top beam 114 with any desired 1D or 2D distribution shape based on any number or distribution of diffracted sub-beams 110 from any number or distribution of sub-beams 106.

Referring now to FIGS. 1C-1F, various non-limiting configurations of beam-splitting sub-system 102 are described in greater detail, in accordance with one or more embodiments of the present disclosure. For simplicity and clarity of illustration, FIGS. 1C-1F depict variations of FIG. 1B in which only the internal components of the beam-splitting sub-system 102 are varied, while other components of the beam shaping system 100 as well as the resulting flat-top beam 114 remain constant. However, it is to be understood that these illustrations are not limiting.

The beam-splitting sub-system 102 may include any number or combination of components suitable for providing multiple sub-beams 106 temporally uncorrelated sub-beams 106 from an incident input beam 104.

In embodiments, the beam-splitting sub-system 102 includes at least one beamsplitter 116 to generate the sub-beams 106 and one or more optical elements configured to direct the sub-beams 106 to the DOE 108 along optical paths with different optical path lengths such that the sub-beams 106 are temporally uncorrelated.

Figure 1C:
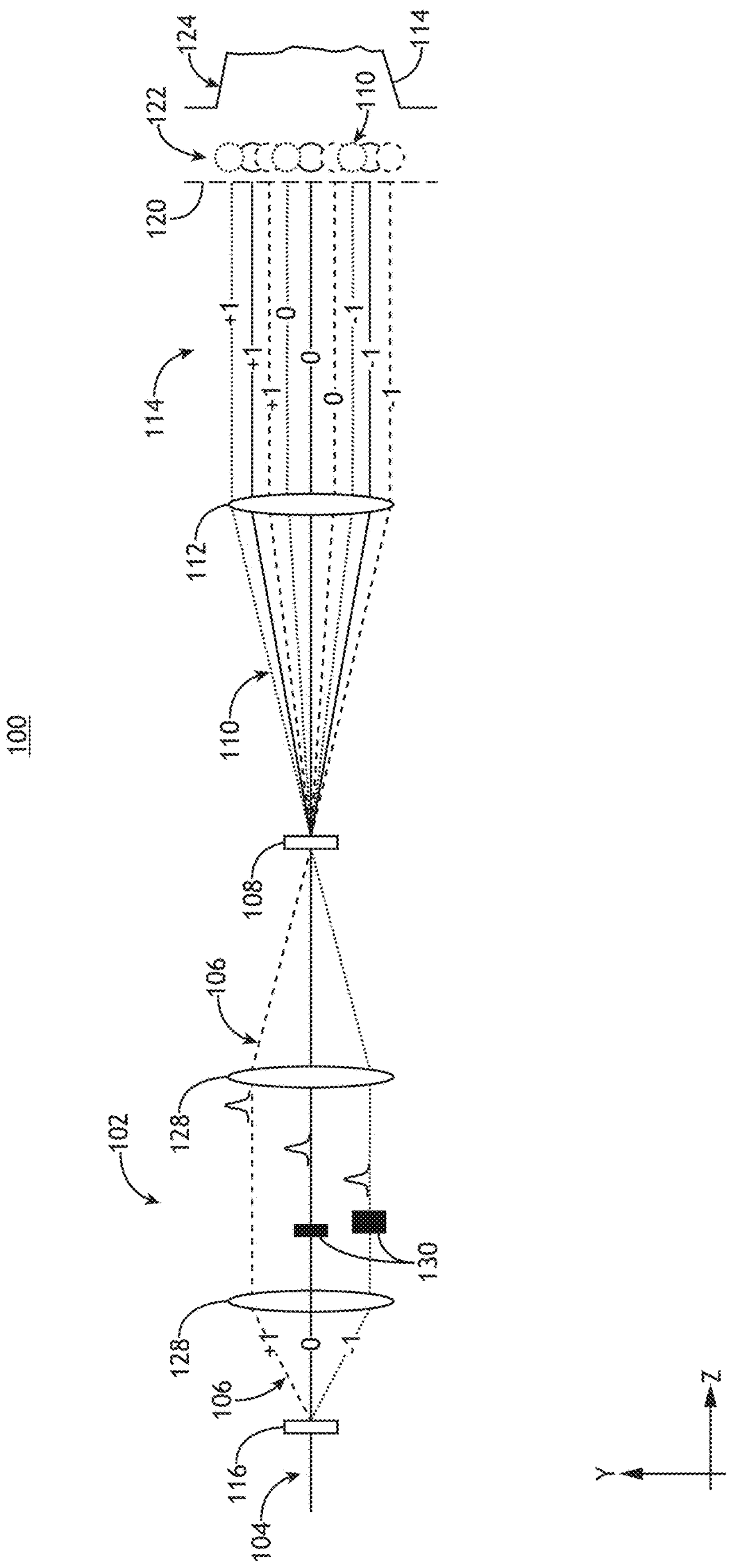
FIG. 1C is a first non-limiting configuration of a beam shaping system, in accordance with one or more embodiments of the present disclosure.

FIG. 1C is a first non-limiting configuration of a beam shaping system 100, in accordance with one or more embodiments of the present disclosure.

In embodiments, the beam-splitting sub-system 102 may include a beamsplitter 116 formed as an additional DOE to diffract the input beam 104. In this way, the sub-beams 106 may correspond to diffraction orders of the input beam 104. As an illustration, FIG. 1C depicts three sub-beams 106 associated with a +1 diffraction order, 0 diffraction order, and a −1 diffraction order. Such a beamsplitter 116 configured as an additional DOE may be configured to provide the sub-beams 106 with any intensities. In some configurations, a beamsplitter 116 configured as an additional DOE provides sub-beams 106 with equal intensities.

FIG. 1C further depicts two lenses 128 configured to collect the diverging sub-beams 106 from the beamsplitter 116 and direct these sub-beams 106 to a common location on the DOE 108 with different incidence angles to produce an interlaced pattern of diffracted sub-beams 110 as described previously herein. It is to be understood, however, that the beam-splitting sub-system 102 may utilize any number of lenses in any configuration including, but not limited to, a single lens.

The beam-splitting sub-system 102 may utilize any number or type of optical components to provide different optical path lengths for the various sub-beams 106. In embodiments, as depicted in FIG. 1C, the beam-splitting sub-system 102 includes an optical delay 130 in an optical path of at least one of the sub-beams 106. An optical delay 130 may include any component suitable for adjusting an optical path length of light and may include, but is not limited to, a transparent optical element (e.g., a transparent slab of material transparent to a sub-beam 106 with a selected thickness), an optical fiber with a selected length, or a retroreflector mounted to a translation stage. As an illustration, FIG. 1C depicts a configuration including two optical delays 130 associated with two of the three sub-beams 106 that are formed as transparent optical elements with different thickness.

Figure 1D:
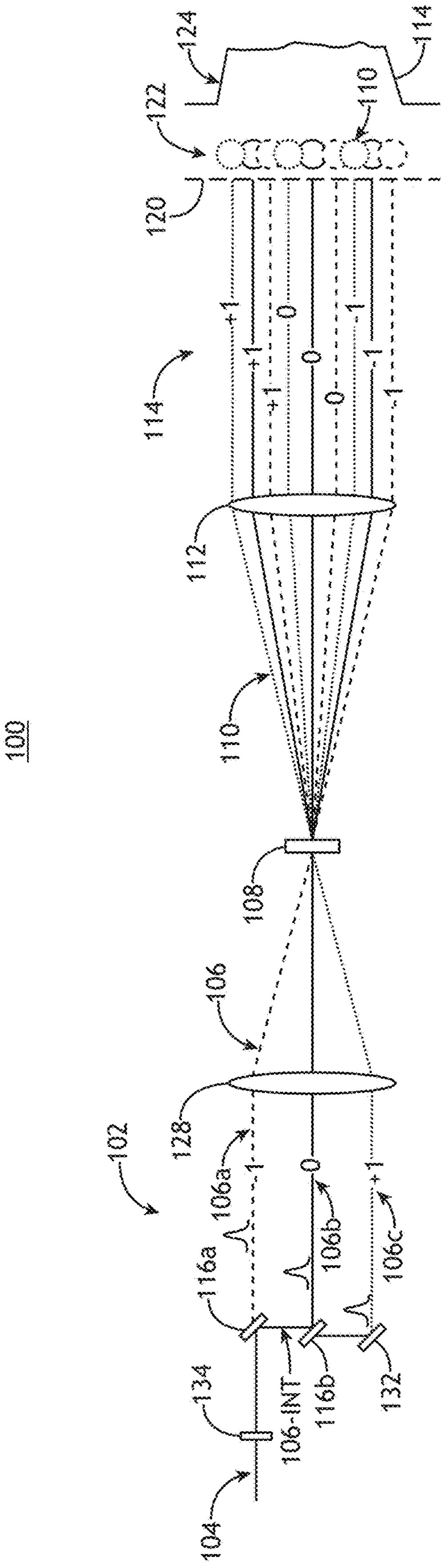
FIG. 1D is a second non-limiting configuration of a beam shaping system, in accordance with one or more embodiments of the present disclosure.

FIG. 1D is a second non-limiting configuration of a beam shaping system 100, in accordance with one or more embodiments of the present disclosure. In embodiments, the beam-splitting sub-system 102 includes two or more beamsplitters 116 configured to generate the sub-beams 106. For example, the beam-splitting sub-system 102 may include multiple beamsplitters 116 with splitting ratios designed to provide sub-beams 106 of equal intensity, though this is not a requirement.

For example, FIG. 1D depicts a configuration in which the beam-splitting sub-system 102 includes a first beamsplitter 116*a* with a 1:2 splitting ratio (e.g., transmission to reflection splitting ratio) and a second beamsplitter 116*b* with a 1:1 splitting ratio. In this configuration, the first beamsplitter 116*a* may split an input beam 104 into a first sub-beam 106*a* and an intermediate sub-beam 106-INT with twice the intensity of the first sub-beam 106*a*. The second beamsplitter 116*b* may then split the intermediate sub-beam 106-INT into a second sub-beam 106*b* and a third sub-beam 106*c*, where all sub-beams 106*a-c* have equal intensities.

FIG. 1D further depicts a mirror 132 to deflect the third sub-beam 106*c* and a lens 128 to direct the sub-beams 106*a-c* to a common point on a DOE 108 at different incidence angles for the generation of diffracted sub-beams 110 as described with respect to FIG. 1B.

It is contemplated herein that a configuration of the beam-splitting sub-system 102 with multiple cascading beamsplitters 116 may naturally provide the various sub-beams 106*a-c* along different optical paths with different optical path lengths such that the resulting diffracted sub-beams 110 may incoherently combine to form the flat-top beam 114. For example, in FIG. 1D, the cascading beamsplitters 116 (and the mirror 132) provide different optical path lengths for the sub-beams 106*a-c* prior to the DOE 108.

It is further contemplated herein that the beam-splitting sub-system 102 may incorporate any combination of polarizing or non-polarizing beamsplitters 116 and may further incorporate one or more polarization rotators 134 of any type such as, but not limited to, a waveplate or a Pockel's cell. In this way, the polarization states of light in the beam-splitting sub-system 102 may be controlled, which may be utilized for any purpose including, but not limited to, controlling splitting ratios of any beamsplitter 116 or for controlling polarization states of any of the sub-beams 106 incident on the DOE 108. For example, a non-polarizing beamsplitter 116 may split light without regard to the polarization state of incident light, whereas a polarizing beamsplitter 116 may transmit light polarized along one direction and reflect light polarized along another (e.g., orthogonal) direction.

As an illustration, FIG. 1D includes a polarization rotator 134 prior to the first beamsplitter 116*a* oriented to rotate a linearly polarized input beam 104 to provide the desired 1:2 splitting ratio. In this configuration, the second beamsplitter 116*b* may be unpolarized or polarized. In the case that the second beamsplitter 116*b* is also polarized, it may be oriented to provide the desired 1:1 splitting ratio or be placed after an additional polarization rotator 134 (not shown) to rotate the polarization of the intermediate sub-beam 106-INT to provide the 1:1 splitting ratio.

Figure 1E:
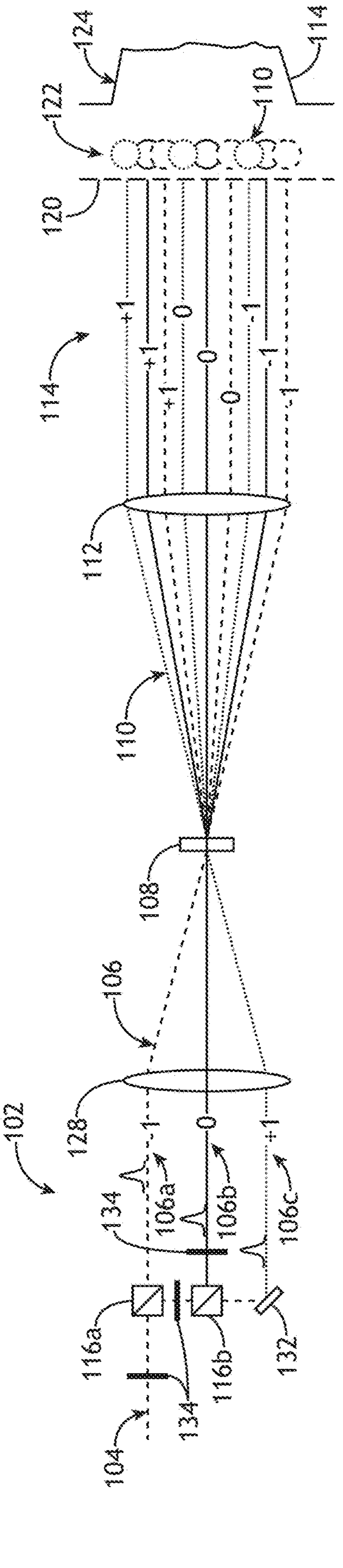
FIG. 1E is a third non-limiting configuration of a beam shaping system, in accordance with one or more embodiments of the present disclosure.

FIG. 1E is a third non-limiting configuration of a beam shaping system 100, in accordance with one or more embodiments of the present disclosure. FIG. 1E depicts a configuration substantially similar to FIG. 1D, but where the first beamsplitter 116*a* and the second beamsplitter 116*b* are formed as polarizing beamsplitter cubes (PBSCs). FIG. 1E further depicts polarization rotators 134 positioned to control the polarization states of the input beam 104 (e.g., prior to the first beamsplitter 116*a*), the intermediate sub-beam 106-INT (e.g., prior to the second beamsplitter 116*b*), and the second sub-beam 106*b*. It is to be understood, however, that FIG. 1E is provided solely for illustrative purposes and should not be interpreted as limiting. Rather, the beam-splitting sub-system 102 may include polarization rotators 134 at any location to control the polarization states of any light internal to the beam-splitting sub-system 102 and/or polarization states of any of the sub-beams 106 incident on the DOE 108.

Figure 1F:
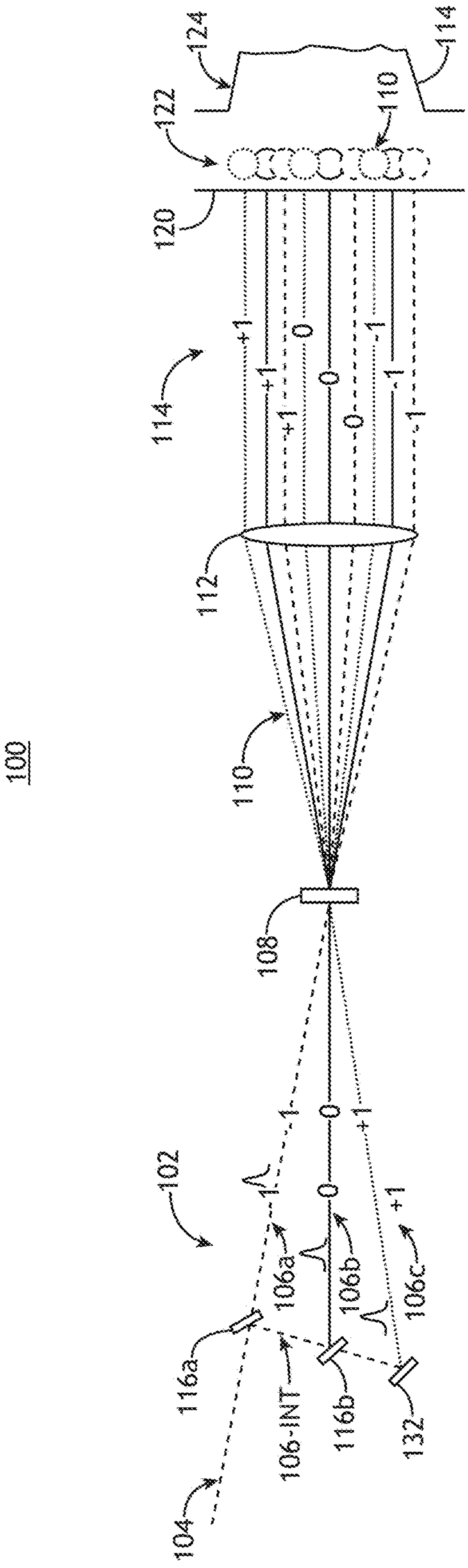
FIG. 1F is a fourth non-limiting configuration of a beam shaping system, in accordance with one or more embodiments of the present disclosure.

FIG. 1F is a fourth non-limiting configuration of a beam shaping system 100, in accordance with one or more embodiments of the present disclosure. In particular, FIG. 1F depicts a configuration of the beam-splitting sub-system 102 with multiple beamsplitters 116 and without any additional lenses 128 (e.g., as depicted in FIGS. 1C-1E). In this configuration, the beamsplitters 116*a,b* as well as the mirror 132 are oriented to split the input beam 104 into the sub-beams 106*a-c* and direct these sub-beams 106*a-c* to a common point on the DOE 108 with different incidence angles and different optical path lengths.

Referring generally to FIGS. 1B-1F, it is to be understood that FIGS. 1C-1F and the associated descriptions are provided solely for illustrative purposes and should not be interpreted as limiting. For example, the beam-splitting sub-system 102 may include any number or combination of beamsplitters 116 and potentially additional components (e.g., lenses 128, mirrors 132, or the like) suitable for providing multiple temporally uncorrelated sub-beams 106. As another example, the beam-splitting sub-system 102 may provide any number of sub-beams 106 and is not limited to three sub-beams 106 as illustrated in FIGS. 1B-1F. As another example, the DOE 108 may generate any number or arrangement of diffracted sub-beams 110 from any of the sub-beams 106 and is not limited to three diffracted sub-beams 110 per incident sub-beam 106 as illustrated in FIGS. 1B-1F. As another example, the beam shaping system 100 may provide a flat-top beam 114 of any size or shape from any 1D or 2D arrangement of diffracted sub-beams 110.

Figure 3:
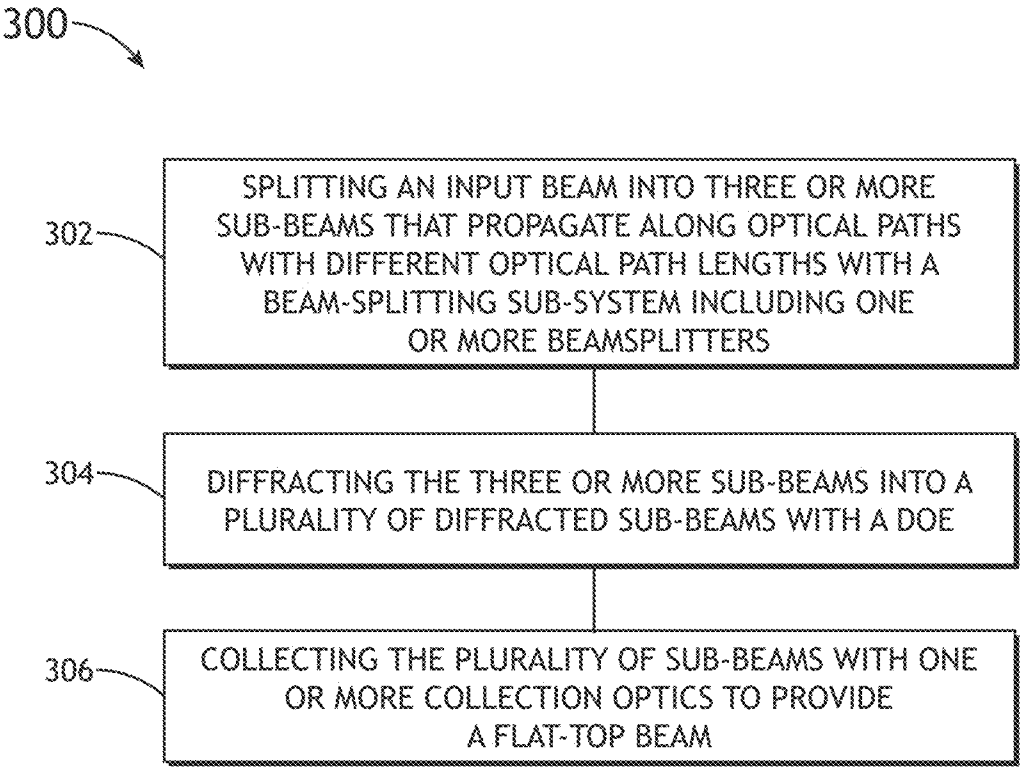
FIG. 3 is a flow diagram illustrating steps performed in a method for generating a flat-top beam, in accordance with one or more embodiments of the present disclosure.

FIG. 3 is a flow diagram illustrating steps performed in a method 300 for generating a flat-top beam 114, in accordance with one or more embodiments of the present disclosure. The applicant notes that the embodiments and enabling technologies described previously herein in the context of the beam shaping system 100 should be interpreted to extend to the method 300. It is further noted, however, that the method 300 is not limited to the architecture of the beam shaping system 100.

In embodiments, the method 300 includes a step 302 of splitting an input beam 104 into three or more sub-beams 106 that propagate along optical paths with different optical path lengths with a beam-splitting sub-system 102 including one or more beamsplitters 116. For example, the step 302 may include splitting the input beam 104 with an additional DOE as a beamsplitter 116, polarizing beamsplitters 116, non-polarizing beamsplitters 116, or any suitable combination of components. Further, different optical path lengths for the sub-beams 106 may be achieved either based on the arrangement of the beamsplitters 116 or other components designed to provide optical paths with different physical distances and/or different lengths of transparent material.

In embodiments, the method 300 includes a step 304 of diffracting the three or more sub-beams 106 into a plurality of diffracted sub-beams 110 with a DOE 108. The step 304 may split each of the sub-beams 106 into any 1D or 2D array (e.g., pattern) of diffracted sub-beams 110. Further, the arrays of diffracted sub-beams 110 may be interlaced.

In embodiments, the method 300 includes a step 306 of collecting the plurality of sub-beams 106 with one or more collection optics 112 to provide a flat-top beam 114. For example, the collection optics 112 may capture diffracted sub-beams 110 emanating from the DOE 108 and direct them along parallel optical paths to form the flat-top beam 114. In embodiments, the diffracted sub-beams 110 from one particular sub-beam 106 may partially overlap diffracted sub-beams 110 from another sub-beam 106 to provide a uniform intensity profile according to any selected metric such as, but not limited to, a peak to valley deviation or statistical measure of variation (e.g., average, variance, standard deviation, RMS, or the like). Additionally, the different optical paths associated with the sub-beams 106 may provide that the associated diffracted sub-beams 110 from are mutually temporally uncorrelated (e.g., incoherent) with respect to each other to mitigate interference and associated speckle effects. As a result, the overall intensity profile of the flat-top beam 114 may be characterized by an incoherent summation of the intensities of the various diffracted sub-beams 110.

It is further contemplated that the systems and methods disclosed herein for providing a flat-top beam 114 from interlaced temporally incoherent diffracted sub-beams 110 provides numerous advantages over alternative techniques.

Figure 4A:
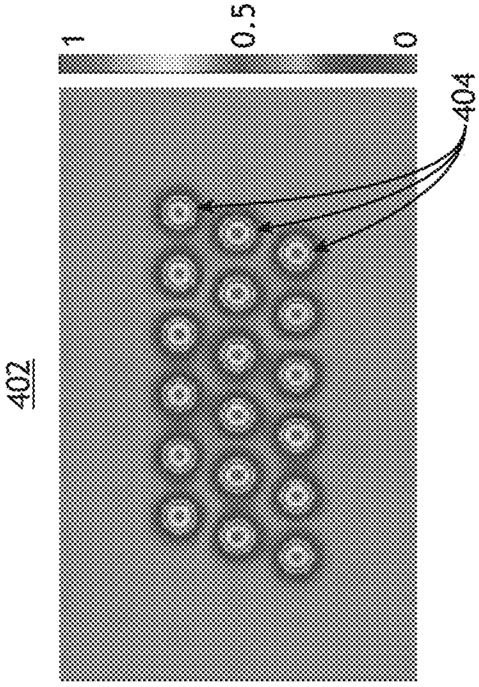
FIG. 4A depicts a cross-sectional distribution of an array of temporally coherent beams, in accordance with one or more embodiments of the present disclosure.
Figure 4B:
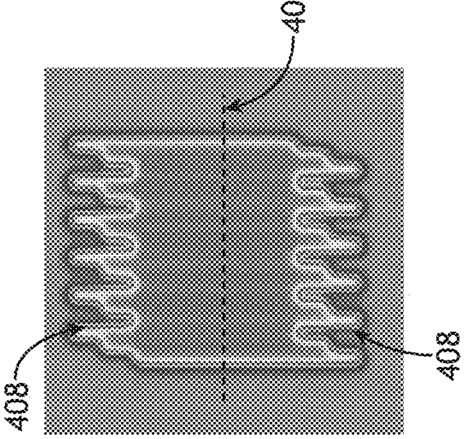
FIG. 4B depicts a cross-sectional distribution of effective total intensity resulting from scanning the array in FIG. 4A, in accordance with one or more embodiments of the present disclosure.
Figure 4C:
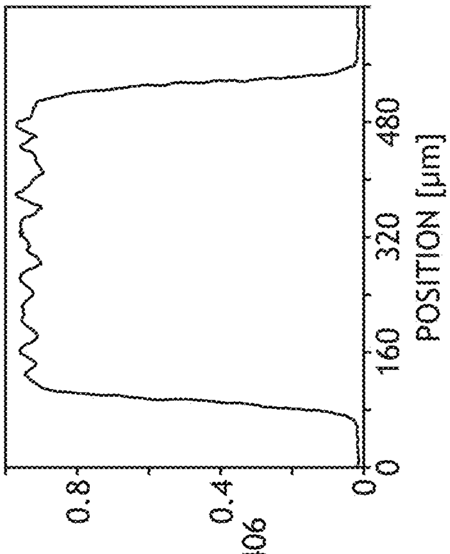
FIG. 4C depicts a 1D cross section of the effective total intensity along a line shown in FIG. 4B, in accordance with one or more embodiments of the present disclosure.

As an illustration, FIGS. 4A-4C depict a technique for providing an effective beam with a uniform distribution based on scanning an array of temporally coherent spots over a sample. In particular, FIG. 4A depicts a cross-sectional distribution of an array 402 of temporally coherent beams 404, in accordance with one or more embodiments of the present disclosure. In this configuration, the beams 404 must be separated by at least a factor of 1.5 times a beam diameter to avoid interference and uniform diffraction efficiency among the different beams 404 if generated based on diffraction. Because of this, the uniformity of the array 402 is poor. FIG. 4B depicts a cross-sectional distribution of effective total intensity (e.g., summed intensity) resulting from scanning the array 402 in FIG. 4A, in accordance with one or more embodiments of the present disclosure. FIG. 4C depicts a 1D cross section of the effective total intensity along a line 406 shown in FIG. 4B, in accordance with one or more embodiments of the present disclosure.

As shown in FIGS. 4B-4C, offsetting rows of beams 404 within the array 402 may allow tailoring of an effective total intensity on certain portions of a sample via scanning. For instance, the rows of beams 404 in FIG. 4A are shifted by ⅓ of a beam diameter. However, such an approach has multiple limitations. For example, such an approach does not provide an instantaneously uniform flat-top distribution (e.g., see FIG. 4A) but rather only provides uniformity in sum after scanning. This may limit the applicability of such a technique, particularly when scanning along multiple directions is advantageous. As another example, such an approach may typically provide non-uniform total intensity for certain regions of the sample. As an illustration, the regions 408 in FIG. 4B exhibit substantially non-uniform intensity. As another example, such an approach is unsuitable for providing a 1D flat-top beam since multiple shifted rows of beams 404 are required. As another example, the use of scanning optics may introduce unwanted complexity and/or cost.

Figure 5:
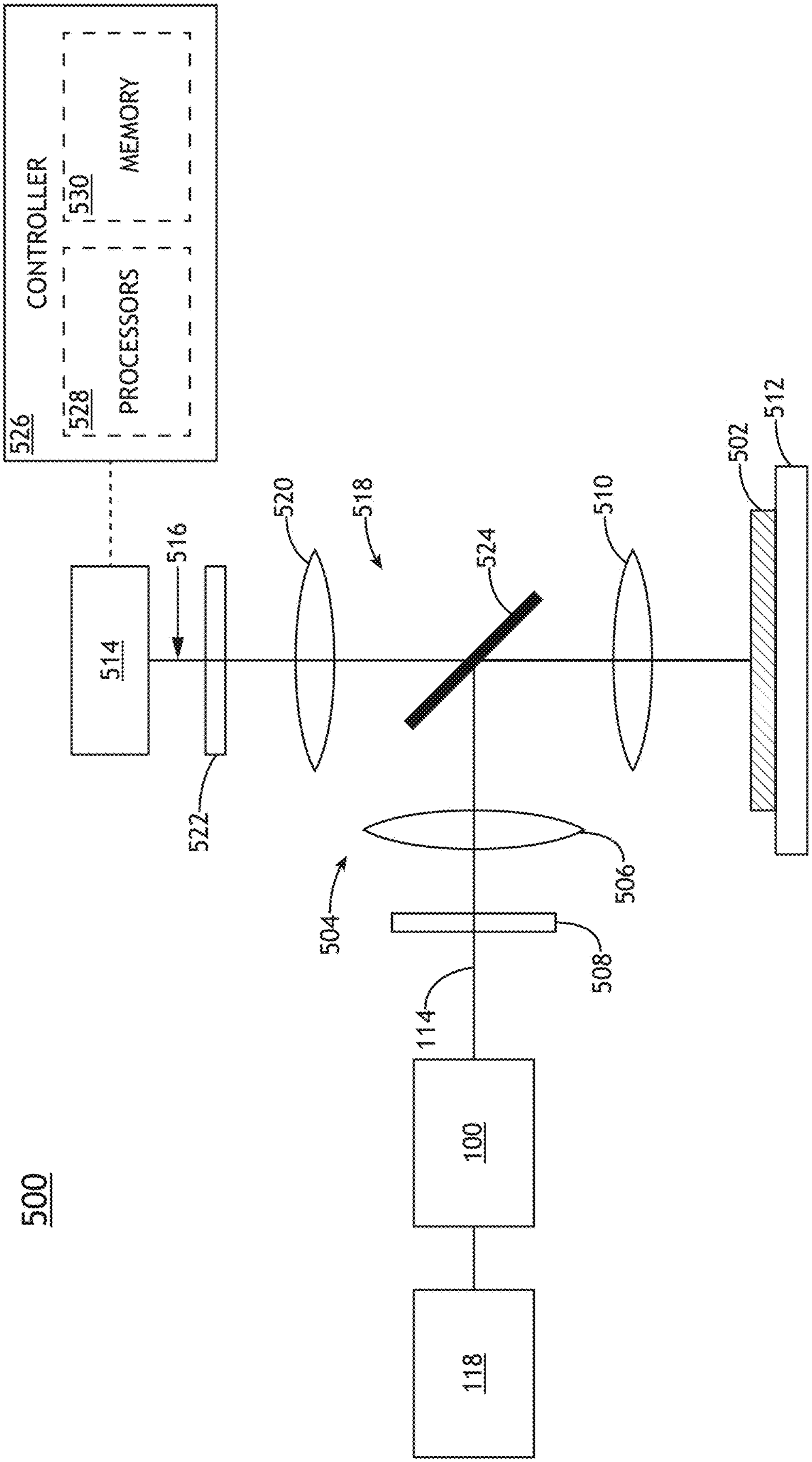
FIG. 5 is a simplified schematic view of an optical system including a beam shaping system providing a flat-top beam, in accordance with one or more embodiments of the present disclosure.

Referring now to FIG. 5, FIG. 5 is a simplified schematic view of an optical system 500 including a beam shaping system 100 providing a flat-top beam 114, in accordance with one or more embodiments of the present disclosure. The beam shaping system 100 may be incorporated into any type of optical system 500 known in the art such as, but not limited to, a metrology system configured to generate metrology data based on illumination with the flat-top beam 114, an inspection system configured to identify and/or characterize defects on a sample based on illumination with the flat-top beam 114, or a laser machining system configured to modify one or more properties of a sample with the flat-top beam 114.

In embodiments, the optical system 500 includes an illumination source 118 configured to generate an input beam 104 and a beam shaping system 100 to generate a flat-top beam 114 from the input beam 104. The input beam 104 and thus the flat-top beam 114 may include one or more selected wavelengths of light including, but not limited to, ultraviolet (UV) radiation, visible radiation, or infrared (IR) radiation.

The illumination source 118 may include any type of illumination source known in the art suitable for producing an input beam 104. In one embodiment, the illumination source 118 is a laser source. For example, the illumination source 118 may include, but is not limited to, one or more narrowband laser sources, a broadband laser source, a supercontinuum laser source, a white light laser source, or the like. In this regard, the illumination source 118 may provide an input beam 104 having high coherence (e.g., high spatial coherence and/or temporal coherence).

In embodiments, the optical system 500 directs the flat-top beam 114 to a sample 502 via an illumination pathway 504. The illumination pathway 504 may include one or more optical components suitable for modifying and/or conditioning the flat-top beam 114 as well as directing the flat-top beam 114 to the sample 502. In one embodiment, the illumination pathway 504 includes one or more illumination-pathway lenses 506. In another embodiment, the illumination pathway 504 includes one or more illumination-pathway optics 508 that may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In embodiments, the optical system 500 includes an objective lens 510 to focus the flat-top beam 114 onto the sample 502. In another embodiment, the sample 502 is disposed on a sample stage 512 suitable for securing the sample 502 and further configured to position the sample 502 with respect to the flat-top beam 114.

In another embodiment, the optical system 500 includes one or more detectors 514 configured to capture light or other emanating from the sample 502 (e.g., collected light 516) through a collection pathway 518. The collection pathway 518 may include one or more optical elements suitable for modifying and/or conditioning the collected light 516 from the sample 502. In one embodiment, the collection pathway 518 includes one or more collection-pathway lenses 520, which may include, but is not required to include, the objective lens 510. In another embodiment, the collection pathway 518 includes one or more collection-pathway optics 522 to shape or otherwise control the collected light 516. For example, the collection-pathway optics 522 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

A detector 514 may be located at any selected location within the collection pathway 518. In one embodiment, the optical system 500 includes a detector 514 at a field plane (e.g., a plane conjugate to the sample 502) to generate an image of the sample 502. In another embodiment, the optical system 500 includes a detector 514 at a pupil plane (e.g., a diffraction plane) to generate a pupil image. In this regard, the pupil image may correspond to an angular distribution of light from the sample 502 detector 514. For instance, diffraction orders associated with diffraction of the flat-top beam 114 from the sample 502 may be imaged or otherwise observed in the pupil plane. In a general sense, a detector 514 may capture any combination of reflected (or transmitted), scattered, or diffracted light from the sample 502.

The optical system 500 may include any number or type of detectors 514 suitable for capturing light from the sample 502 such as, but not limited to, a photodiode, a charge-coupled device (CCD) or a complementary metal-oxide semiconductor (CMOS) device, a line sensor, or a time-delay-integration (TDI) sensor.

In another embodiment, the optical system 500 includes a scanning sub-system to scan the sample 502 with respect to the measurement field during a metrology measurement. For example, the sample stage 512 may position and orient the sample 502 within a focal volume of the objective lens 510. In another embodiment, the sample stage 512 includes one or more adjustable stages such as, but not limited to, a linear translation stage, a rotational stage, or a tip/tilt stage. In another embodiment, though not shown, the scanning sub-system includes one or more beam-scanning optics (e.g., rotatable mirrors, galvanometers, or the like) to scan the flat-top beam 114 with respect to the sample 502).

The illumination pathway 504 and the collection pathway 518 of the optical system 500 may be oriented in a wide range of configurations suitable for illuminating the sample 502 with the flat-top beam 114 and collecting light emanating from the sample 502 in response to the incident flat-top beam 114. For example, as illustrated in FIG. 5, the optical system 500 may include a beamsplitter 524 oriented such that a common objective lens 510 may simultaneously direct the flat-top beam 114 to the sample 502 and collect light from the sample 502. By way of another example, the illumination pathway 504 and the collection pathway 518 may contain non-overlapping optical paths.

In embodiments, the optical system 500 includes a controller 526 including one or more processors 528 configured to execute program instructions maintained on memory 530, or memory medium. In this regard, the one or more processors 528 of controller 526 may execute any of the various process steps described throughout the present disclosure.

The one or more processors 528 of a controller 526 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 528 may include any device configured to execute algorithms and/or instructions (e.g., program instructions stored in memory). In one embodiment, the one or more processors 528 may be embodied as a desktop computer, mainframe computer system, workstation, image computer, parallel processor, networked computer, or any other computer system configured to execute a program configured to operate or operate in conjunction with the optical system 500, as described throughout the present disclosure.

The memory 530 may include any storage medium known in the art suitable for storing program instructions executable by the associated one or more processors 528. For example, the memory 530 may include a non-transitory memory medium. By way of another example, the memory 530 may include, but is not limited to, a read-only memory (ROM), a random-access memory (RAM), a magnetic or optical memory device (e.g., disk), a magnetic tape, a solid-state drive and the like. It is further noted that memory 530 may be housed in a common controller housing with the one or more processors 528. In one embodiment, the memory 530 may be located remotely with respect to the physical location of the one or more processors 528 and controller 526. For instance, the one or more processors 528 of the controller 526 may access a remote memory (e.g., server), accessible through a network (e.g., internet, intranet and the like).

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:

a diffractive optical element (DOE);

a beamsplitting apparatus including one or more beamsplitters configured to split an input beam into three or more sub-beams that propagate along optical paths with different optical path lengths to the DOE at a common location on the DOE and at different incidence angles;

the DOE configured to diffract each of the three or more sub-beams into a respective array of diffracted sub-beams, wherein the arrays of diffracted sub-beams are interlaced; and one or more optical elements configured to collect the interlaced diffracted sub-beams to provide a flat-top beam.

2. The system of claim 1, wherein an intensity of the flat-top beam is spatially uniform within a selected tolerance.

3. The system of claim 1, wherein the input beam is temporally coherent, wherein the diffraction sub-beams associated with the three or more sub-beams are mutually incoherent based on the different optical path lengths, wherein an intensity of the flat-top beam is associated with incoherent summing of intensities of the plurality of diffracted sub-beams.

4. The system of claim 1, wherein the plurality of diffracted sub-beams partially overlap in the flat-top beam.

5. The system of claim 1, wherein the one or more beamsplitters comprise an additional DOE configured to split the input beam into the three or more sub-beams.

6. The system of claim 5, wherein the beamsplitting apparatus further comprises one or more lenses to direct the three or more sub-beams from the additional DOE to the DOE.

7. The system of claim 1, wherein the beamsplitting apparatus further comprises:

one or more optical delays to provide the different optical path lengths of the three or more sub-beams.

8. The system of claim 7, wherein at least one of the optical delays comprises:

at least one of an optical fiber or a transparent optical element having a selected length.

9. The system of claim 1, wherein the one or more beamsplitters comprise:

two or more beamsplitters.

10. The system of claim 1, wherein at least one of the one or more beamsplitters comprises:

a polarizing beamsplitter.

11. The system of claim 1, further comprising:

one or more polarization rotators configured to adjust polarizations of at least one of the input beam or any of the three or more sub-beams.

12. The system of claim 1, wherein at least one of the two or more beamsplitters comprises:

a nonpolarizing beamsplitter.

13. A system comprising:

a laser source configured to generate an input beam;

a beamsplitting apparatus including one or more beamsplitters configured to split the input beam into three or more sub-beams that propagate along optical paths with different optical path lengths to a diffractive optical element (DOE) at a common location on the DOE and at different incidence angles;

the DOE configured to diffract each of the three or more sub-beams into a respective array of diffracted sub-beams, wherein the arrays of diffracted sub-beams are interlaced; and one or more optical elements configured to collect the interlaced diffracted sub-beams to provide a flat-top beam.

14. The system of claim 13, wherein the diffraction sub-beams associated with the three or more sub-beams are mutually incoherent based on the different optical path lengths, wherein an intensity of the flat-top beam is associated with incoherent summing of intensities of the plurality of diffracted sub-beams.

15. A method comprising:

splitting an input beam into three or more sub-beams that propagate along optical paths with different optical path lengths to a diffractive optical element (DOE) at a common location on the DOE and at different incidence angles with a beamsplitting apparatus including one or more beamsplitters;

diffracting each of the three or more sub-beams into a respective array of diffracted sub-beams with the DOE, wherein the arrays of diffracted sub-beams are interlaced; and collecting the interlaced diffracted sub-beams with one or more optical elements to provide a flat-top beam.

16. The method of claim 15, wherein an intensity of the flat-top beam is spatially uniform within a selected tolerance.

17. The method of claim 15, wherein the input beam is temporally coherent, wherein the diffraction sub-beams associated with the three or more sub-beams are mutually incoherent based on the different optical path lengths, wherein an intensity of the flat-top beam is associated with incoherent summing of intensities of the plurality of diffracted sub-beams.

18. The method of claim 15, wherein splitting the input beam into the three or more sub-beams with the one or more beamsplitters comprises:

splitting the input beam into the three or more sub-beams with an additional DOE.

19. The method of claim 15, the one or more beamsplitters in the beamsplitting apparatus include at least two beamsplitters, wherein splitting the input beam into the three or more sub-beams with the one or more beamsplitters comprises:

splitting the input beam into three or more sub-beams with at least two beamsplitters.

20. The method of claim 15, further comprising:

delaying at least one of the three or more sub-beams with one or more optical delays to provide the different optical path lengths of the three or more sub-beams.

* * * * *